United States Patent Office 3,153,660
Patented Oct. 20, 1964

3,153,660
DI(2-ACYLOXY ETHYL MERCURI) PYROPHOS-
PHATES AND THEIR PREPARATION
Robert J. Convery, Wilmington, Del., assignor to Sun
Oil Company, Philadelphia, Pa., a corporation of New
Jersey
No Drawing. Filed Sept. 16, 1963, Ser. No. 309,319
6 Claims. (Cl. 260—431)

This invention relates to the preparation of novel organic mercury compounds which are di(2-acyloxy ethyl mercuri) pyrophosphates and are obtained in the form of powdery solids. By way of example, di(2-acetoxy ethyl mercuri) pyrophosphate in the form of a pale yellowish white powder is prepared according to the invention.

It is known that ethylene will react with mercury salts of alkanoic acids in the presence of the free alkanoic acid to form 2-acyloxy ethyl mercuri alkanoates. Reactions of this kind have been described in an article appearing in Chemical Review, vol. 48, pages 7–43 (1951).

In my United States Patent No. 3,031,484 the conversion of these 2-acyloxy ethyl mercuri alkanoates into di(2-acyloxy ethyl mercuri) sulfates has been described and claimed. This conversion is effected, for example, by reacting a solution of 2-acetoxy ethyl mercuri acetate in glacial acetic acid with sulfuric acid diluted with glacial acetic acid. The di-salt of sulfuric acid is formed and immediately precipitates from the reaction mixture.

I have now found that di-salts of pyrophosphoric acid can be formed in somewhat similar manner, although the reaction that takes place is not precisely analogous to that which occurs according to the above-mentioned patent. In the present invention phosphoric acid is used in place of sulfuric acid; but instead of obtaining phosphate salts, pyrophosphates result. Furthermore, instead of these di(2-acyloxyl ethyl mercuri) pyrophosphates precipitating from the reaction mixture as in the case of the sulfates, the pyrophosphates remain in solution and an anti-solvent is required to separate the pyrophosphates from the reaction mixture. These novel pyrophosphate compounds have utility as pesticides.

According to the invention, the new pyrophosphate compounds are prepared by first reacting ethylene with a mercuric salt of an alkanoic acid having 1–10 carbon atoms per molecule in the presence of the free alkanoic acid and at a temperature in the range of 0–100° C. which temperature is above the melting point of the acid. For example, when glacial acetic acid is used, the temperature should be above 16° C. A temperature in the range of 20–40° C. preferably is used. This reaction forms the 2-acyloxy ethyl mercuri alkanoate. Phosphoric acid diluted with some of the alkanoic acid is then slowly added to the reaction mixture while it is being agitated at a temperature in the range of 10–50° C., more preferably 20–40° C. After the reaction with the phosphoric acid has been completed, a suitable anti-solvent such as ether or benzene is added. This causes a precipitate to form which is separated from the reaction mixture and constitutes the new type of product, namely, di(2-acyloxy ethyl mercuri) pyrophosphate.

It is important in using the phosphoric acid in the second step described above that it be admixed first with some of the alkanoic acid before it is added to the reaction mixture; otherwise an undesirable decomposition reaction tends to occur if undiluted phosphoric acid is used. If desired the alkanoic acid can be used in admixture with its anhydride in order to consume the water produced as a by-product of the reaction as well as water present in the original phosphoric acid. The proportion of phosphoric acid in the mixture used generally should be in the range of 25–75% by weight of the mixture. Also, if the temperature is above 50° C. when the phosphoric acid mixture is added, an undesirable decomposition reaction tends to occur. Hence it is important that the reaction temperature be kept below 50° C. and more preferably at about 20–25° C. except when the alkanoic acid used has a higher melting point.

The above-described reactions are applicable for the mercuric salts of all alkanoic acids having from one to ten carbon atoms per molecule. The term "alkanoic acid" as herein used is intended to include cycloalkanoic acids as well as straight chain and branched chain aliphatic acids. Examples of suitable alkanoic acids are formic, acetic, propionic, butyric, valeric, isovaleric, caproic, caprylic, capric, cyclohexane carboxylic acid, β-cyclopentyl propionic acid and cyclohexyl acetic acid. The mercury salts of any of these acids in admixture with excess acid will readily undergo reaction with ethylene at a temperature above the melting point of the acid and at atmospheric or higher pressure to form the corresponding 2-acyloxy ethyl mercuri alkanoate. For example, when mercuric acetate in glacial acetic acid is reacted with ethylene, the product is 2-acetoxy ethyl mercuri acetate which has the formula:

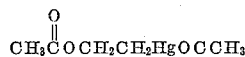

This compound is soluble in the excess acetic acid and hence remains in solution.

When phosphoric acid admixed with glacial acetic acid is added to the solution, the reaction which occurs is as follows:

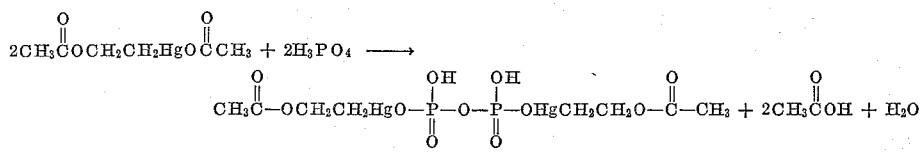

As can be seen from the equation, both water and acetic acid are split out in the reaction and the phosphate group converts to a pyrophosphate group which forms the di-salt. The amount of phosphoric acid added should be approximately the stoichiometric quantity required for formation of the di-salt compound or, in other words, an amount which will provide about one atom of phosphorus for each atom of mercury present. An excess of phosphoric acid may tend to decompose this compound and hence should be avoided.

The pyrophosphate di-salt is soluble in the alkanoic acid solvent and thus does not precipitate from solution as does the di-salt in the case of sulfuric acid. In order to recover the di-salt a suitable anti-solvent should be added to the reaction mixture to cause precipitation. Ethers and aromatic hydrocarbons are suitable anti-solvents for this purpose. Specific examples of anti-solvents are dimethyl ether, diethyl ether, diisopropyl ether, diamyl ether, benzene, toluene, xylenes, cumene and the like.

The unpredictability of the above-described reaction is shown by the fact that when phosphorus acid is substituted for phosphoric acid, analogous di-salts will not be formed and mercurous phosphate is produced instead. Likewise when the mineral acid added is sulfurous acid, the only result is a precipitation of the 2-acetoxy ethyl mercuri acetate from solution.

The following examples are specific illustrations of the invention:

Example I 82.5 g. of mercuric acetate were mixed with 110 ml. of glacial acetic acid to form a slurry. The mixture was stirred at room temperature and ethylene was bubbled into it. The ethylene reacted exothermically to form 2-acetoxy ethyl mercuri acetate which was soluble in the excess acetic acid. When the reaction was complete, the mixture had become a water white solution. This solution was stirred at room temperature and a mixture composed of 29.5 g. of 86% phosphoric acid, 20 g. of glacial acetic acid and 23.2 g. of acetic anhydride was added dropwise at room temperature. After the addition was complete, the reaction mixture was stirred for two hours at room temperature. At this point the reaction product was still in solution. Ethyl ether was added in amount of 500 ml. to effect precipitation of the pyrophosphate di-salt, the mixture was allowed to stand overnight and then was filtered. The precipitate was washed with ether to remove residual acetic acid and was dried. 76 g. of a pale yellow granular product was obtained. Elemental analysis of the product and the theoretical analysis for di(2-acetoxy ethyl mercuri) pyrophosphate are shown below:

|  | Product | Theory |
|---|---|---|
| Percent C | 13.58 | 12.79 |
| Percent H | 3.00 | 2.15 |
| Percent P | 7.91 | 8.25 |
| Percent Hg | 53.26 | 53.39 |
| Percent O | 22.25 | 23.42 |

That the product was the pyrophosphate rather than metaphosphate salt was confined by its nuclear magnetic resonance spectrum which showed the presence of acidic protons thus showing the OH radicals of the pyrophosphate group. The yield of the pyrophosphate di-salt was about 78% of the stoichiometric yield.

Example II

To 90 g. of a glacial acetic acid solution of 2-acetoxy ethyl mercuri acetate, formed in the same manner as described in Example I, a solution composed of 6.6 g. of 86% phosphoric acid in 10 g. of glacial acetic acid was added dropwise while stirring at about room temperature. In this case no acetic anhydride was used. After the addition was complete, the mixture was stirred for two hours and a clear solution was obtained. 250 ml. of ether were added to effect precipitation. The mixture was allowed to stand overnight and then was filtered. After washing the residue with ether and drying, 17.4 g. of the pyrophosphate di-salt were obtained. Elemental analysis of this product, together with the theoretical values for comparison, is shown below.

|  | Product | Theory |
|---|---|---|
| Percent C | 12.78 | 12.79 |
| Percent H | 2.50 | 2.15 |
| Percent P | 8.02 | 8.25 |
| Percent Hg | 52.54 | 53.39 |
| Percent O | 24.16 | 23.42 |

These results show that it is not essential that acetic anhydride be present for taking up the water in the phosphoric acid used or the water released during the reaction.

The novel di(2-acyloxy ethyl mercuri) pyrophosphates prepared according to the invention are effective pesticides and have high activity against microorganisms such as fungi, algae, yeasts and gram negative microorganisms. By way of example, shake flask tests with four types of fungi in mycological broth showed extreme effectiveness of di(2-acetoxy ethyl mercuri) pyrophosphate at a concentration of 100 micrograms per ml. The amounts of cell growth during 3 day tests, as measured in mg./100 ml. of medium, are shown in the following tabulation which includes comparative values for control tests in which none of the pyrophosphate compound was present.

| Fungi | Cell Growth | |
|---|---|---|
|  | Control | Pyrophate Di-salt |
| Aspergillus niger | 0.597 | 0 |
| Alternaria solani | 0.750 | 0 |
| Rhizopus stolonifer | 0.313 | 0 |
| Fusarium oxysporum | 0.573 | 0 |

As can be seen from the data, the di(2-acetoxy ethyl mercuri) pyrophosphate completely inhibited the growth of each of the types of fungus tested.

When the mercuric salts of other alkanoic acids as specified above are used in place of mercuric acetate, substantially similar results are obtained.

I claim:

1. Method of preparing a di(2-acyloxy ethyl mercuri) pyrophosphate which comprises reacting ethylene with a mercuric salt of an alkanoic acid having 1-10 carbon atoms in admixture with the free alkanoic acid corresponding to the alkanoate portion of said salt at a temperature in the range of 0–100° C. and above the melting point of the acid to form 2-acyloxy ethyl mercuri alkanoate, adding to the resulting crude product mixture at a temperature in the range of 10–50° C. a mixture of phosphoric acid and said alkanoic acid containing 25–75% phosphoric acid by weight, whereby di(2-acyloxy ethyl mercuri) pyrophosphate is formed, and separating said pyrophosphate from the rest of the reaction mixture.

2. Method according to claim 1 wherein the temperature in each of the reaction steps is in the range of 20–40° C.

3. Method of preparing di(2-acetoxy ethyl mercuri) pyrophosphate which comprises reacting ethylene with mercuric acetate in glacial acetic acid at a temperature in the range of 16–100° C. to form acetoxy ethyl mercuri acetate, adding to the resulting crude product mixture at a temperature in the range of 16–50° C. a mixture of phosphoric acid and glacial acetic acid containing 25–75% phosphoric acid by weight, whereby di(2-acetoxy ethyl mercuri) pyrophosphate is formed, and separating said pyrophosphate from the rest of the reaction mixture.

4. Method according to claim 3 wherein the temperature in each of the reaction steps is in the range of 20–40° C.

5. Di(2-acyloxy ethyl mercuri) pyrophosphate in which the acyloxy groups correspond to an alkanoic acid having from one to ten carbon atoms.

6. Di(2-acetoxy ethyl mercuri) pyrophosphate.

No references cited.